(12) United States Patent
Nishikawa et al.

(10) Patent No.: US 11,396,074 B2
(45) Date of Patent: Jul. 26, 2022

(54) MACHINING CONDITION-DETERMINING DEVICE AND CUTTING TOOL SELECTION APPARATUS

(71) Applicant: DMG MORI CO., LTD., Nara (JP)

(72) Inventors: Shizuo Nishikawa, Nara (JP); Morihiro Hideta, Nara (JP); Koji Iiyama, Nara (JP); Masataka Sakamoto, Nara (JP); Kengo Kawai, Nara (JP)

(73) Assignee: DMG MORI CO., LTD., Nara (JP)

( * ) Notice: Subject to any disclaimer, the term of this patent is extended or adjusted under 35 U.S.C. 154(b) by 798 days.

(21) Appl. No.: 16/335,087

(22) PCT Filed: May 24, 2017

(86) PCT No.: PCT/JP2017/019321
§ 371 (c)(1),
(2) Date: Mar. 20, 2019

(87) PCT Pub. No.: WO2018/066166
PCT Pub. Date: Apr. 12, 2018

(65) Prior Publication Data
US 2021/0276136 A1    Sep. 9, 2021

(30) Foreign Application Priority Data
Oct. 4, 2016 (JP) .............................. JP2016-196537

(51) Int. Cl.
*G05B 19/416* (2006.01)
*B23Q 15/20* (2006.01)

(52) U.S. Cl.
CPC ......... *B23Q 15/20* (2013.01); *G05B 19/4163* (2013.01); *G05B 2219/49074* (2013.01)

(58) Field of Classification Search
None
See application file for complete search history.

(56) References Cited

U.S. PATENT DOCUMENTS 7,110,854 B2 * 9/2006 Kajiyama ............ G05B 19/414
700/181
10,671,046 B2 * 6/2020 Watanabe .............. B23Q 17/12

FOREIGN PATENT DOCUMENTS

| JP | H05237740 A | 9/1993 |
|----|-------------|--------|
| JP | H09026811 A | 5/1999 |

(Continued)

OTHER PUBLICATIONS

International Search Report for related Application No. PCT/JP2017/019321; report dated Jul. 18, 2017.

*Primary Examiner* — Ryan A Jarrett
(74) *Attorney, Agent, or Firm* — von Briesen & Roper, s.c.

(57) ABSTRACT

A machining condition determining apparatus (1) includes a first setter (2a) setting a cutting speed of a cutting tool, a storage (3) storing a maximum output value of a drive motor rotating a spindle holding the cutting tool and a number of revolutions of the drive motor corresponding to the maximum output value, a number-of-revolutions determiner (4) obtaining a steady-state value of the maximum output value of the drive motor stored in the storage (3) and determining a number of revolutions of the drive motor corresponding to the obtained steady-state value of the maximum output value, and a tool-diameter determiner (5) calculating a tool diameter of the cutting tool based on the cutting speed set by the first setter (2a) and the number of revolutions of the drive motor determined by the number-of-revolutions determiner (4).

7 Claims, 6 Drawing Sheets

(56) References Cited

FOREIGN PATENT DOCUMENTS

| | | | |
|---|---|---|---|
| JP | H11129141 | A | 5/1999 |
| JP | H11277371 | A | 10/1999 |
| JP | 2012155473 | A | 8/2012 |

* cited by examiner

MACHINING CONDITION-DETERMINING DEVICE AND CUTTING TOOL SELECTION APPARATUS

TECHNICAL FIELD

The present invention relates to a machining condition determining apparatus determining machining conditions for a cutting tool to be used in a machine tool, and a cutting tool selecting apparatus selecting a cutting tool to be used in a machine tool performing a machining with a plurality of cutting tools.

BACKGROUND ART

The Taylor's equation has been known as defining a relation between cutting speed (peripheral velocity) of a cutting tool and life of the cutting tool (refer to, for example, Patent Literature 1). The Taylor's equation is represented by $VT^n = C$, where V is the cutting speed, T is the tool life, and n and C are constants determined based on some conditions. This equation is used to calculate a cutting tool life.

In cutting, it is important how to lengthen cutting tool life. However, it is often the case that machining a workpiece efficiently in a short time is the first propriety for a user who uses a machine tool. Because of this, it is possible that cutting speed is increased in order to shorten machining time.

CITATION LIST

Patent Literature

Patent Literature 1: Japanese Unexamined Patent Application Publication No. H9-26811

SUMMARY OF INVENTION

Technical Problem

However, when cutting speed is increased, cutting efficiency is improved with the increase in cutting speed; however, according to the Taylor's equation, tool life is shortened. As a result, tool change is more frequently performed, which leads to the problem of increase in tool cost. Accordingly, it has been difficult to achieve a high-efficiency machining.

The present invention has been achieved in view of the above-described circumstances, and an object thereof is to provide a machining condition determining apparatus which is able to determine machining conditions achieving an improved cutting efficiency without shortening tool life, and a cutting tool selecting apparatus which is able to select a cutting tool achieving an improved cutting efficiency without shortening tool life.

Solution to Problem

A machining condition determining apparatus according to the present invention determines machining conditions for a cutting tool to be used in a machine tool, the apparatus including:

a first setter setting a cutting speed of the cutting tool;

a storage storing therein a maximum output value of a drive motor rotating a shaft holding the cutting tool and a number of revolutions of the drive motor corresponding to the maximum output value;

a number-of-revolutions determiner obtaining a steady-state value of the maximum output value of the drive motor stored in the storage and determining a number of revolutions of the drive motor corresponding to the obtained steady-state value of the maximum output value; and a tool-diameter determiner calculating a tool diameter of the cutting tool based on the cutting speed set by the first setter and the number of revolutions of the drive motor determined by the number-of-revolutions determiner. Note that, in the present invention, the aforementioned shaft means a spindle holding and rotating a tool, and encompasses, for example, a tool spindle in a machining center, a similar tool spindle in a combined lathe, and a spindle for a tool disposed on a turret in a lathe (which spindle is also called "milling spindle").

The inventors found out that cutting efficiency could be improved with cutting speed being maintained and without shortening tool life by, in an equation which can calculate the cutting speed of the Taylor's equation, which directly affects the tool life, in another aspect, that is, $Vc = \pi \times D \times n$ (where Vc is the cutting speed, D is a tool diameter, and n is a drive motor's number of revolutions), variously adjusting the tool diameter and the number of revolutions with the cutting speed being maintained without being increased.

In the machining condition determining apparatus according to the present invention, data on correspondence relation between a maximum output value of a drive motor rotating the cutting tool and a number of revolutions of the drive motor corresponding to the maximum output value is previously stored in the storage. The maximum output value of the drive motor increases until a certain number of revolutions is reached, and shows a steady-state value at and above the certain number of revolutions.

Once a cutting speed of the cutting tool is input by a user, the first setter sets the cutting speed. Further, the number-of-revolutions determiner obtains the steady-state value of the maximum output value of the drive motor stored in the storage. Furthermore, the number-of-revolutions determiner determines a number of revolutions of the drive motor corresponding to the obtained steady-state value of the maximum output value.

Once the number of revolutions of the drive motor is determined by the number-of-revolutions determiner, the tool-diameter determiner calculates a tool diameter of the cutting tool based on the number of revolutions and the cutting speed set by the first setter. Specifically, the tool-diameter determiner calculates the tool diameter in accordance with the aforementioned equation: $Vc = \pi \times D \times n$.

In this process, as for the number of revolutions of the drive motor corresponding to the obtained steady-state value of the maximum output value, the number-of-revolutions determiner may designate a minimum value corresponding to the steady-state value as the number of revolutions of the drive motor or may designate a maximum value corresponding to the steady-state value as the number of revolutions of the drive motor. Further, the number-of-revolutions determiner may designate a number of revolutions between the minimum and the maximum values corresponding to the steady-state value as the number of revolutions of the drive motor. In this case, because, as seen from the aforementioned equation: $Vc = \pi \times D \times n$, the tool diameter and the number of revolutions have a trade-off relation, under the condition that the cutting speed is maintained, the number of revolutions decreases when the tool diameter is increased, while the number of revolutions increases when the tool diameter is decreased.

Accordingly, in the present invention, in terms of improving cutting efficiency by increasing the tool diameter as much as possible so as to perform a machining with fewer paths, the number-of-revolutions determiner can designate the minimum value corresponding to the steady-state value as the number of revolutions of the drive motor. In contrast, the tool diameter may be decreased as much as possible in terms of improving cutting efficiency by increasing the number of revolutions so as to reduce load on the cutting tool. In this case, the number-of-revolutions determiner can designate the maximum value corresponding to the steady-state value as the number of revolutions of the drive motor. That is to say, in the present invention, both the number-of-revolutions determiner designating the minimum value corresponding to the steady-state value as the number of revolutions of the drive motor and the number-of-revolutions determiner designating the maximum value corresponding to the steady-state value as the number of revolutions of the drive motor contribute to improvement of cutting efficiency.

Thus, in the machining condition determining apparatus according to the present invention, the tool-diameter determiner can calculate a tool diameter corresponding to the number of revolutions of the drive motor, i.e., a tool diameter as a machining condition achieving an improved cutting efficiency, with a cutting speed set by the user being maintained (i.e., without increasing the cutting speed). Therefore, using a cutting tool having the calculated tool diameter for machining in the machine tool enables an improved cutting efficiency without shortening tool life of the cutting tool.

The machining condition determining apparatus may include:

a second setter setting, as initial values, a depth of cut $a_p$ by the cutting tool, a width of cut $a_e$ by the cutting tool, a maximum feed per tooth $f_z$ determined based on an edge geometry of the cutting tool, the number of revolutions n of the drive motor determined by the number-of-revolutions determiner, a number of tooth z of the cutting tool, a specific cutting resistance $k_c$ obtained in advance based on the tool diameter, and a mechanical efficiency η obtained in advance;

a motor-output-value calculator calculating an output value $P_c$ of the drive motor in accordance with an equation:

$$P_c = a_p \times a_e \times f_z \times n \times z \times k_c / (60 \times 10^6 \times \eta);$$

a load-ratio calculator calculating a load ratio that is a ratio between the output value and the steady-state value of the maximum output value stored in the storage; and a display part displaying the load ratio.

In this aspect, based on an operation by the user, the second setter sets initial values: a depth of cut $a_p$, a width of cut $a_e$, a maximum feed per tooth $f_z$, the number of revolutions n of the drive motor determined by the number-of-revolutions determiner, a number of tooth z of the cutting tool, a specific cutting resistance $k_c$, and a mechanical efficiency η. Based on the initial values set by the second setter, the motor-output-value calculator calculates an output value of the drive motor in accordance with the aforementioned equation. Further, the load-ratio calculator calculates a load ratio that is a ratio between the calculated output value and the steady-state value of the maximum output value stored in the storage. The calculated load ratio is displayed in the display part. Thereby, the user is allowed to recognize the load ratio for the case of employing the cutting tool having the tool diameter calculated by the tool-diameter determiner under the initial values.

The machining condition determining apparatus may further include a cutting-efficiency calculator calculating a cutting efficiency $C_e$ based on the output value, the specific cutting resistance, and the mechanical efficiency, the cutting efficiency $C_e$ being represented by an equation:

$$C_e = a_p \times a_e \times f_z \times n \times z; \text{ and}$$

the display part may be configured to display the cutting efficiency.

In this aspect, the cutting-efficiency calculator calculates a cutting efficiency based on the output value, the specific cutting resistance, and the mechanical efficiency. The calculated cutting efficiency is displayed in the display part. Thereby, the user is allowed to recognize the cutting efficiency under the initial values.

The machining condition determining apparatus may include a third setter changing and setting the load ratio to a desired value;

the motor-output-value calculator may be configured to recalculate the output value based on the changed and set load ratio;

the machining condition determining apparatus may further include a condition changer changing at least one of major machining conditions based on the recalculated output value, the major machining conditions consisting of the depth of cut, the width of cut, and the feed per tooth;

the cutting-efficiency calculator may be configured to recalculate the cutting efficiency based on the recalculated output value and the value or values changed by the condition changer; and the display part may be configured to display at least one of first information and second information, the first information consisting of the recalculated cutting efficiency, the second information consisting of the major machining condition or conditions changed by the condition changer and the major machining condition or conditions not changed by the condition changer.

In this aspect, once the user inputs a desired load ratio after recognizing the displayed load ratio, the third setter sets the input load ratio. In this case, for example, when the displayed load ratio falls far below an upper limit, the user can set a load ratio greater than the displayed load ratio, while when the displayed load ratio is very close to the upper limit, the user can set a load ratio smaller than the displayed load ratio.

Based on the changed load ratio, the motor-output-value calculator recalculates the output value of the drive motor. When the output value of the drive motor is changed by the recalculation, as seen from the aforementioned equation: $P_c = a_p \times a_e \times f_z \times n \times z \times k_c / (60 \times 10^6 \times \eta)$, at least one of major machining conditions consisting of the depth of cut, the width of cut, and the feed per tooth needs to be changed. Accordingly, in the present invention, at least one of the major machining conditions is automatically changed by the condition changer. Based on the recalculated output value of the drive motor and the value or values changed by the condition changer, the cutting-efficiency calculator recalculates the cutting efficiency. At least one of first information consisting of the recalculated cutting efficiency and second information consisting of the major machining condition or conditions changed by the condition changer and the major machining condition or conditions not changed by the condition changer is displayed in the display part. Thus, the machining condition determining apparatus is configured such that, when the load ratio is changed based on the user's intention, the condition changer automatically changes the major machining conditions accordingly, and the cutting-efficiency calculator recalculates the cutting efficiency after the change of the major machining conditions. With this configuration, the user can recognize the cutting efficiency and major machining conditions for the case of changing the load ratio to a desired load ratio, by viewing the display part.

The machining condition determining apparatus may further include a fourth setter changing and setting at least one of major machining conditions, the major machining conditions consisting of the depth of cut, the width of cut, and the feed per tooth;

the cutting-efficiency calculator may be configured to recalculate the cutting efficiency based on the value or values changed and set by the fourth setter;

the load-ratio calculator may be configured to recalculate the load ratio based on the recalculated cutting efficiency; and the display part may be configured to display at least one of the recalculated cutting efficiency and the recalculated load ratio.

In this aspect, at least one of the major machining conditions is changed and set by the fourth setter based on an input operation by the user. The cutting-efficiency calculator is configured to recalculate the cutting efficiency based on the changed value or values. The load-ratio calculator recalculates the load ratio based on the recalculated cutting efficiency. Therefore, by variously changing the major machining conditions, the user can determine a cutting efficiency and a load ratio from several cutting efficiencies and load ratios obtained.

The machining condition determining apparatus may further include a fifth setter changing and setting at least one of the depth of cut, the width of cut, and the feed per tooth with the load ratio being maintained;

the cutting-efficiency calculator may be configured to recalculate the cutting efficiency based on the value or values changed and set by the fifth setter; and the display part may be configured to display the recalculated cutting efficiency.

In this aspect, at least one of the major machining conditions is changed and set by the fifth setter with the load ratio being maintained (i.e., with the load ratio being unchanged). The cutting-efficiency calculator is configured to recalculate the cutting efficiency based on the changed value or values. Therefore, by variously changing the major machining conditions, the user can determine a cutting efficiency from several cutting efficiencies obtained with the load ratio being unchanged.

A cutting tool selecting apparatus according to the present invention selects a cutting tool to be used in a machine tool performing a machining with a plurality of cutting tools, the apparatus including:

a setter setting a cutting speed of the cutting tool;

a first storage storing therein a maximum output value of a drive motor rotating a shaft holding the cutting tool and a number of revolutions of the drive motor corresponding to the maximum output value;

a number-of-revolutions determiner obtaining a steady-state value of the maximum output value of the drive motor stored in the first storage and determining a number of revolutions of the drive motor corresponding to the obtained steady-state value of the maximum output value;

a tool-diameter determiner calculating a tool diameter of the cutting tool based on the cutting speed set by the setter and the number of revolutions of the drive motor determined by the number-of-revolutions determiner;

a second storage having previously stored therein a tool diameter of each of the plurality of cutting tools; and a tool selector comparing the tool diameter calculated by the tool-diameter determiner with the tool diameters stored in the second storage, in a case where any of the tool diameters stored in the second storage is coincident with the tool diameter calculated by the tool-diameter determiner, the tool selector selecting the cutting tool having the coincident tool diameter, and in a case where none of the tool diameters stored in the second storage is coincident with the tool diameter calculated by the tool-diameter determiner, the tool selector selecting the cutting tool having a tool diameter closest to the tool diameter calculated by the tool-diameter determiner.

In the cutting tool selecting apparatus according to the present invention, relation between a maximum output value of a drive motor rotating the cutting tool and a number of revolutions of the drive motor corresponding to the maximum output value is previously stored in the first storage.

Once a cutting speed of the cutting tool is input by a user, the setter sets the cutting speed. Further, the number-of-revolutions determiner obtains a steady-state value of the maximum output value of the drive motor stored in the first storage. Furthermore, the number-of-revolutions determiner determines a number of revolutions of the drive motor corresponding to the obtained steady-state value of the maximum output value.

Once the number of revolutions of the drive motor is determined by the number-of-revolutions determiner, the tool-diameter determiner calculates a tool diameter of the cutting tool based on the number of revolutions and the cutting speed set by the setter. Specifically, the tool-diameter determiner calculates the tool diameter in accordance with the aforementioned equation: $Vc = \pi \times D \times n$.

In this process, in the present invention, in terms of improving cutting efficiency by increasing the tool diameter as much as possible so as to perform a machining with fewer paths, the number-of-revolutions determiner can designate a minimum value corresponding to the steady-state value as the number of revolutions of the drive motor. In contrast, the tool diameter may be decreased as much as possible in terms of improving cutting efficiency by increasing the number of revolutions so as to reduce load on the cutting tool. In this case, the number-of-revolutions determiner can designate a maximum value corresponding to the steady-state value as the number of revolutions of the drive motor. That is to say, in the present invention, both the number-of-revolutions determiner designating the minimum value corresponding to the steady-state value as the number of revolutions of the drive motor and the number-of-revolutions determiner designating the maximum value corresponding to the steady-state value as the number of revolutions of the drive motor contribute to improvement of cutting efficiency.

Further, tool diameters of the plurality of cutting tools are previously stored in the second storage. The tool selector compares the tool diameter calculated by the tool-diameter determiner with the tool diameters stored in the second storage. In a case where any of the tool diameters stored in the second storage is coincident with the tool diameter calculated by the tool-diameter determiner, the tool selector selects the cutting tool having the coincident tool diameter. On the other hand, in a case where, in the comparison, none of the tool diameters stored in the second storage is coincident with the tool diameter calculated by the tool-diameter determiner, the tool selector selects the cutting tool having a tool diameter closest to the tool diameter calculated by the tool-diameter determiner.

Thus, in the cutting tool selecting apparatus according to the present invention, the tool-diameter determiner can calculate a tool diameter corresponding to the number of revolutions of the drive motor, i.e., a tool diameter achieving an improved cutting efficiency, with a cutting speed set by the user being maintained. Based on the calculated tool diameter, the tool selector selects a cutting tool having a tool diameter coincident with the calculated tool diameter or a cutting tool having a tool diameter closest to the calculated tool diameter. Therefore, using the cutting tool selected by the tool selector for machining in the machine tool enables an improved cutting efficiency without shortening tool life of the cutting tool.

Advantageous Effects of Invention

As described above, the present invention can provide a machining condition determining apparatus which is able to determine machining conditions achieving an improved cutting efficiency without shortening tool life, and a cutting tool selecting apparatus which is able to select a cutting tool achieving an improved cutting efficiency without shortening tool life.

DESCRIPTION OF EMBODIMENTS

Hereinafter, a machining condition determining apparatus and a cutting tool selecting apparatus according to embodiments of the present invention will be described with reference to the drawings.

Figure 1:
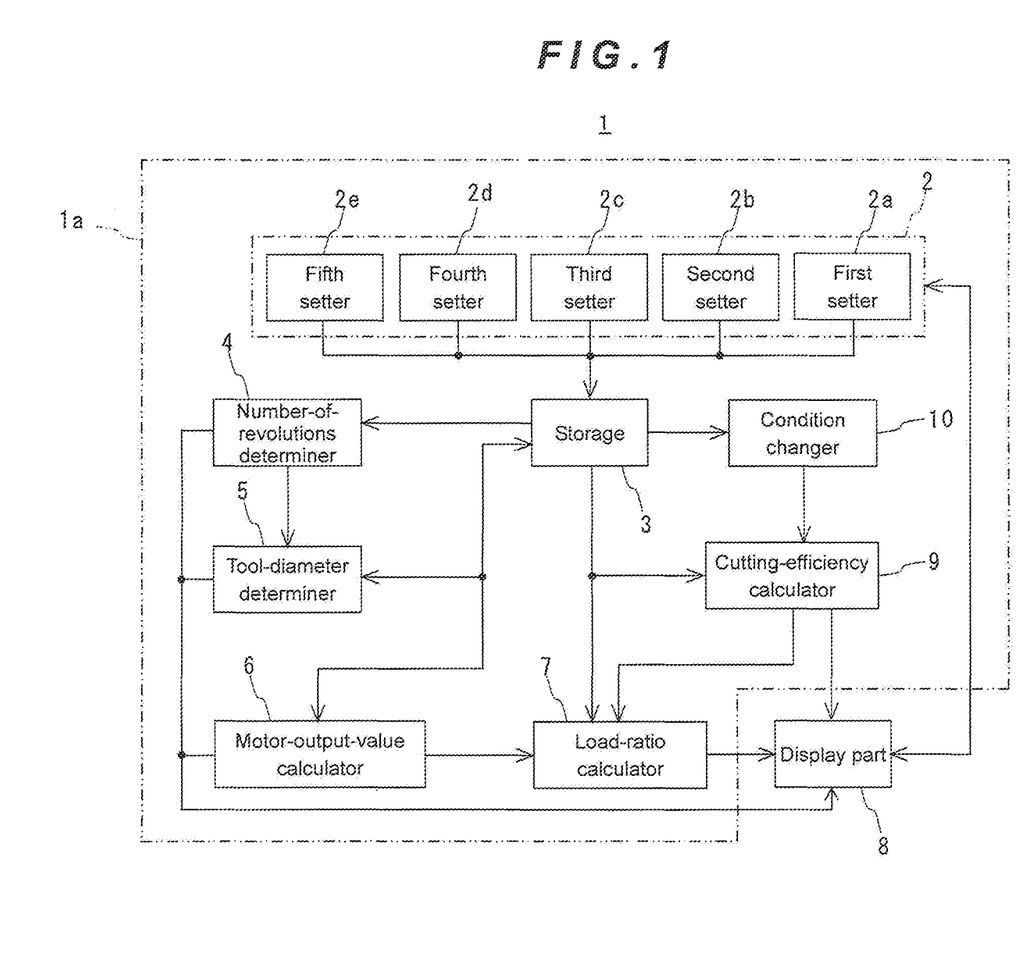
FIG. 1 is a block diagram showing a configuration of a machining condition determining apparatus according to an embodiment of the present invention.

As shown in FIG. 1, the machining condition determining apparatus 1 according to this embodiment includes first through fifth setters 2a, 2b, 2c, 2d, 2e, a storage 3 constituted by any of various memories or the like, a number-of-revolutions determiner 4, a tool-diameter determiner 5, a motor-output-value calculator 6, a load-ratio calculator 7, a display part 8, a cutting-efficiency calculator 9, and a condition changer 10. In this embodiment, a computing device 1a consisting of the first through fifth setters 2a, 2b, 2c, 2d, 2e, the storage 3, the number-of-revolutions determiner 4, the tool-diameter determiner 5, the motor-output-value calculator 6, the load-ratio calculator 7, the cutting-efficiency calculator 9, and the condition changer 10 may be incorporated in an NC (Numerical Control) device, or, alternatively, the computing device 1a may be applied as an external device which communicates with an NC device. The display part 8 is constituted by, for example, a touch panel of an operation panel; however, the display part 8 is not limited to such a display part having an input function, and the display part may be combined with a keyboard or the like. The first through fifth setters 2a, 2b, 2c, 2d, 2e, the number-of-revolutions determiner 4, the tool-diameter determiner 5, the motor-output-value calculator 6, the load-ratio calculator 7, the cutting-efficiency calculator 9, and the condition changer 10 are functionally implemented by a CPU, which is provided in the machining condition determining apparatus 1, executing a predetermined program stored in a memory. Note that the first through fifth setters 2a, 2b, 2c, 2d, 2e are included in a setter 2.

With the machining condition determining apparatus 1 according to this embodiment, by a user setting a desired cutting speed, a tool diameter can be calculated which, when a machining using a cutting tool is performed with the set cutting speed, achieves an improved cutting efficiency without shortening the tool life of the cutting tool. This is described in detail below.

First, a user inputs, into an input section 8c (see FIG. 3) that is displayed in the display part 8 under control by the setter 2, a desired cutting speed by operating keys that are not shown in the drawings. Note that inputs hereinafter are made in the same manner. The set information is stored into the storage 3 by the first setter 2a. Further, the storage 3 has previously stored therein a maximum output value of a drive motor rotating a spindle holding a cutting tool in a machine tool, and a number of revolutions of the drive motor corresponding to the maximum output value.

Figure 2:
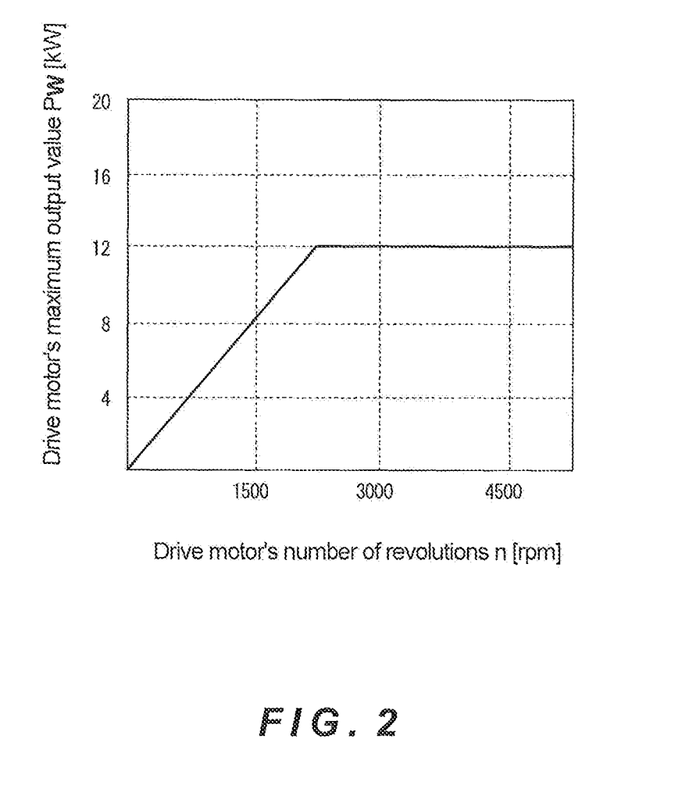
FIG. 2 is a graph showing a maximum output value of a drive motor and the number of revolutions of the drive motor corresponding to the maximum output value which are stored in the storage in FIG. 1.

The number-of-revolutions determiner 4 obtains a steady-state value of the maximum output value of the drive motor stored in the storage 3. Specifically, as shown in FIG. 2, the maximum output value of the drive motor continues to increase until a certain number of revolutions is reached, and it shows the steady-state value at and above the certain number of revolutions. For example, in FIG. 2, the steady-state value of the maximum output value is 12 kW.

Further, the number-of-revolutions determiner 4 determines a number of revolutions of the drive motor corresponding to the obtained steady-state value of the maximum output value. In this embodiment, in terms of improving cutting efficiency by increasing a tool diameter as much as possible so as to perform a machining with fewer paths, the number-of-revolutions determiner 4 designates a minimum value of the number of revolutions corresponding to the steady-state value as the number of revolutions of the drive motor.

Figure 3:
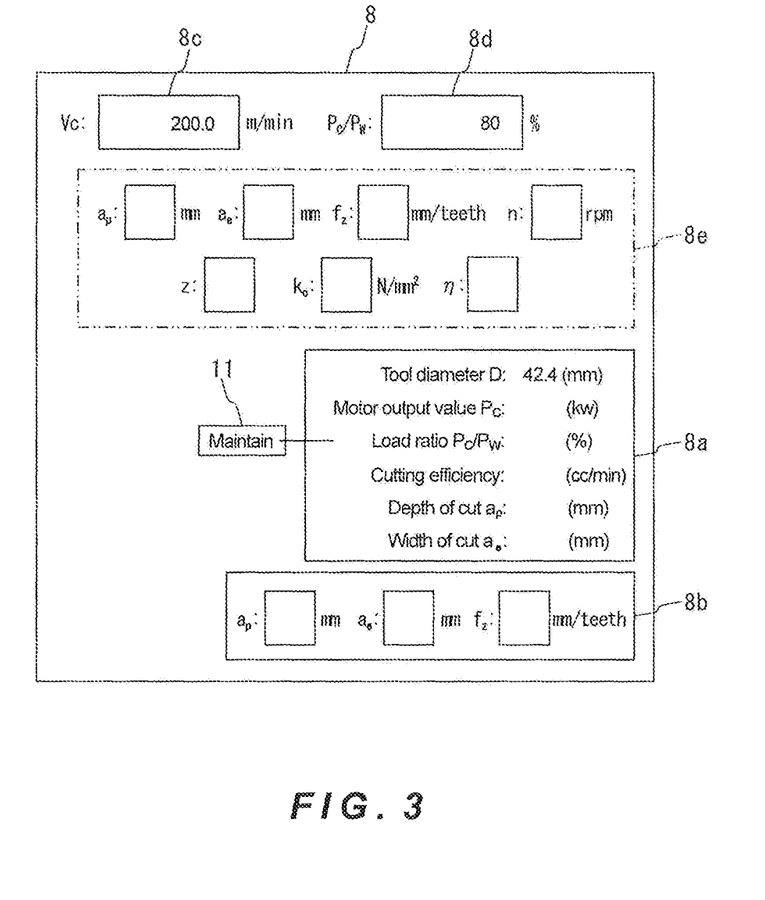
FIG. 3 is an illustration showing an example display configuration of the display part in FIG. 1.

Once the number of revolutions of the drive motor is determined by the number-of-revolutions determiner 4 in the above-described manner, the tool-diameter determiner 5 calculates a tool diameter of a cutting tool to be used in the machine tool under the cutting speed set by the first setter 2a, based on the determined number of revolutions and the set cutting speed. In this case, the tool-diameter determiner 5 calculates the tool diameter in accordance with an equation: $Vc = \pi \times D \times n$ (where Vc is the cutting speed, D is the tool diameter, and n is the number of revolutions of the drive motor). The calculated tool diameter is, as shown in FIG. 3, displayed in a display area 8a provided in the display part 8. Thus, by inputting and setting a desired cutting speed, the user can recognize an optimum tool diameter to be used in the machine tool, i.e., a tool diameter achieving an improved cutting efficiency without shortening tool life.

Subsequently, the user can recognize a load ratio (%) by setting predetermined machining conditions, the load ratio being a ratio between an output value of the drive motor and the steady-state value of the maximum output value stored in the storage 3. This is described in detail below. Note that the load ratio can also be called "spindle load".

As shown in FIG. 3, the user inputs, into an input section 8e that is displayed in the display part 8 under control by the setter 2, initial values: a depth of cut $a_p$ by the cutting tool, a width of cut $a_e$ by the cutting tool, a maximum feed per tooth $f_z$, which is determined based on an edge geometry of the cutting tool, a number of revolutions n of the drive motor, a number of tooth z of the cutting tool, a specific cutting resistance $k_c$, which is obtained in advance, and a mechanical efficiency η, which is obtained in advance. The set initial values are stored into the storage 3 by the second setter 2b. Note that, as for the number of revolutions of the drive motor in the input section 8e, the number of revolutions determined by the number-of-revolutions determiner 4 is to be automatically input into a predetermined place in the input section 8e.

Once the initial values are set by the user, the motor-output-value calculator 6 (see FIG. 1) calculates an output value $P_c$ of the drive motor in accordance with an equation below. The calculated output value is stored into the storage 3 and displayed in the display area 8a of the display part 8 (see FIG. 3). Thereby, the user is allowed to visually recognize the output value of the drive motor.

$$P_c = a_c \times a_e \times f_z \times n \times z \times k_c/(60 \times 10^6 \times \eta),$$

where the mechanical efficiency is obtained in advance through actual cutting, and the specific cutting resistance is obtained in advance in accordance with the following equation:

$$k_c = k_{c1} \times h_m^{-m_c} \times (1 - \gamma_0/100),$$

where $k_{c1}$ is a specific cutting resistance when a chip thickness is 1 mm, $m_c$ is a coefficient for variation of the specific cutting resistance depending on the chip thickness, and $\gamma_0$ is a tool rake angle, and $h_m$ is a mean chip thickness that is obtained in accordance with the following equation:

$$h_m = 360 \times \sin \kappa_r \times a_e \times f_z/(\pi \times D \times a \cos(1 - 2 \times a_e/D)),$$

where $\kappa_r$ is a cutting edge angle.

Once the output value of the drive motor is calculated by the motor-output-value calculator 6 in the above-described manner, the load-ratio calculator 7 (see FIG. 1) calculates a load ratio that is a ratio between the output value of the drive motor and the steady-state value of the maximum output value of the drive motor stored in the storage 3. The calculated load ratio is displayed in the display area 8a of the display part 8 (see FIG. 3). Thereby, the user is allowed to visually recognize the load ratio.

After the load ratio is calculated by the load-ratio calculator 7 in the above-described manner, the cutting-efficiency calculator 9 (see FIG. 1) calculates a cutting efficiency in accordance with an equation below based on the output value of the drive motor calculated in the above-described manner, the specific cutting resistance, and the mechanical efficiency. The calculated cutting efficiency is displayed in the display area 8a of the display part 8 (see FIG. 3). Thereby, the user is allowed to visually recognize the cutting efficiency.

$$C_e = a_p \times a_e \times f_z \times n \times z$$

At this point, the user can input a desired load ratio into an input section 8d (see FIG. 3) that is displayed in the display part 8 under control by the setter 2. In this case, for example, after visually recognizing the load ratio calculated by the load-ratio calculator 7 and displayed, the user can set a desired load ratio which is greater than the displayed load ratio or set a desired load ratio which is smaller than the displayed load ratio. The changed and set load ratio is stored into the storage 3 by the third setter 2c.

Once the load ratio is changed and set by the user, the motor-output-value calculator 6 (see FIG. 1) recalculates the output value of the drive motor based on the changed and set load ratio. The recalculated output value of the drive motor is stored into the storage 3 and displayed in the display area 8a of the display part 8. Thereby, the user is allowed to visually recognize the recalculated output value of the drive motor.

As seen from the aforementioned equation: $P_c = a_p \times a_e \times f_z \times n \times z \times k_c/(60 \times 10^6 \times \eta)$, when the output value of the drive motor is changed by the motor-output-value calculator 6, at least one of major machining conditions consisting of the depth of cut, the width of cut, and the feed per tooth needs to be changed. Accordingly, the condition changer 10 (see FIG. 1) is configured to automatically change at least one of the major machining conditions accordingly. The major machining condition or conditions changed by the condition changer 10 and the major machining condition or conditions not changed by the condition changer 10 are displayed in a display area 8b of the display part 8 (see FIG. 3). Thereby, the user is allowed to recognize both the changed one or ones and unchanged one or ones of the major machining conditions.

Based on the recalculated output value of the drive motor and the value or values changed by the condition changer 10, the cutting-efficiency calculator 9 (see FIG. 1) recalculates the cutting efficiency. The recalculated cutting efficiency is displayed in the display area 8a of the display part 8. Thereby, the user is allowed to visually recognize the recalculated cutting efficiency.

Further, after visually recognizing the recalculated cutting efficiency, the user can input a desired value for at least one of the major machining conditions (i.e., the depth of cut, the width of cut, and the feed per tooth) into the input section 8e. For example, in a case where the user desires a cutting efficiency greater than the recalculated cutting efficiency, the user can change and set at least one of the major machining conditions to a greater value (i.e., a value greater than the current value). In this case, the user can set the value of each major machining condition to a greater value by using the value of the major machining condition displayed in the display area 8b of the display part 8 as a reference value. The value or values of the major machining condition or conditions changed by the user are stored into the storage 3 by the fourth setter 2d.

Subsequently, the cutting-efficiency calculator 9 (see FIG. 1) recalculates the cutting efficiency based on the value or values of the major machining condition or conditions changed by the user and the value or values of the major machining condition or conditions not changed by the user. Further, the load-ratio calculator 7 (see FIG. 1) recalculates the load ratio based on the recalculated cutting efficiency. The recalculated cutting efficiency and load ratio are displayed in the display area 8a of the display part 8 (see FIG. 3). Thereby, the user is allowed to visually recognize the cutting efficiency and load ratio recalculated based on the major machining conditions he or she changed. Thus, the user can obtain several cutting efficiencies by variously changing the major machining conditions, and the user can determine an appropriate one from the obtained cutting efficiencies.

As described above, it is possible to seek a cutting efficiency for the case where the load ratio is changed; however, as described below, it is also possible to seek a cutting efficiency by changing the major machining conditions with the load ratio being maintained.

As shown in FIG. 3, by pressing the "Maintain" button 11 displayed on the left side of "Load ratio" in the display area 8a of the display part 8, the user can maintain (that is, fix)

the load ratio displayed in the display area 8*a* of the display part 8. In this case, the load ratio to be maintained may be the load ratio calculated after the input made into the input section 8*e* by the user, or may be the load ratio changed and set to a desired value by the input made into the input section 8*d* by the user.

Subsequently, the user can input a desired value for at least one of the major machining conditions (i.e., the depth of cut, the width of cut, and the feed per tooth) into the input section 8*e*. The value or values of the major machining condition or conditions changed by the user are stored into the storage 3 by the fifth setter 2*e*. Once the major machining condition or conditions are changed by the user, the cutting-efficiency calculator 9 recalculates the cutting efficiency based on the changed and set value or values with the load ratio being maintained. The recalculated cutting efficiency is displayed in the display area 8*a* of the display part 8. Thereby, the user is allowed to visually recognize the cutting efficiency recalculated based on the major machining conditions he or she changed with the load ratio being maintained. Thus, the user can obtain several cutting efficiencies by variously changing the major machining conditions with the load ratio being maintained, and the user can determine an appropriate one from the obtained cutting efficiencies.

As described above, in the machining condition determining apparatus 1 according to this embodiment, the tool-diameter determiner 5 can calculate a tool diameter corresponding to the number of revolutions of the drive motor, i.e., a tool diameter as a machining condition achieving an improved cutting efficiency, with a cutting speed set by the user being maintained (i.e., without increasing the cutting speed). Therefore, using a cutting tool having the calculated tool diameter for machining in the machine tool enables an improved cutting efficiency without shortening the tool life of the cutting tool.

Further, in this embodiment, the motor-output-value calculator 6 calculates an output value of the drive motor based on the aforementioned initial values set by the second setter 2*b*. Further, the load-ratio calculator 7 calculates a load ratio. Thereby, the user is allowed to easily recognize the load ratio for the case of employing the cutting tool having the tool diameter calculated by the tool-diameter determiner 5 under the initial values.

Further, in this embodiment, the cutting-efficiency calculator 9 calculates a cutting efficiency. Thereby, the user is allowed to easily recognize the cutting efficiency under the initial values.

Further, in this embodiment, after recognizing the load ratio displayed in the display area 8*a* of the display part 8, the user can change and set the load ratio to a desired value. When the load ratio is thus changed, the major machining conditions are to be automatically changed by the condition changer 10 accordingly, and the cutting-efficiency calculator 9 recalculates the cutting efficiency after the change of the major machining conditions. With this configuration, the user can recognize the cutting efficiency and major machining conditions for the case of changing the load ratio to the desired value.

Further, in this embodiment, after recognizing the displayed cutting efficiency, the user can change and set at least one of the major machining conditions. Based on the changed major machining condition or conditions, the cutting-efficiency calculator 9 recalculates the cutting efficiency. Based on the recalculated cutting efficiency, the load-ratio calculator 7 recalculates the load ratio. With this configuration, the user can determine a cutting efficiency and a load ratio from several cutting efficiencies and load ratios obtained, by variously changing the major machining conditions.

Further, in this embodiment, it is possible to change and set at least one of the major machining conditions with the load ratio being maintained (i.e., with the load ratio being unchanged). Based on the changed major machining conditions, the cutting-efficiency calculator 9 recalculates the cutting efficiency. With this configuration, the user can determine a cutting efficiency from several cutting efficiencies obtained with the load ratio being unchanged, by variously changing the major machining conditions.

Next, a cutting tool selecting apparatus according to an embodiment of the present invention will be described with reference to the drawings. The cutting tool selecting apparatus according to this embodiment selects an appropriate cutting tool to be used in a machine tool performing a machining with a plurality of cutting tools.

Figure 4:
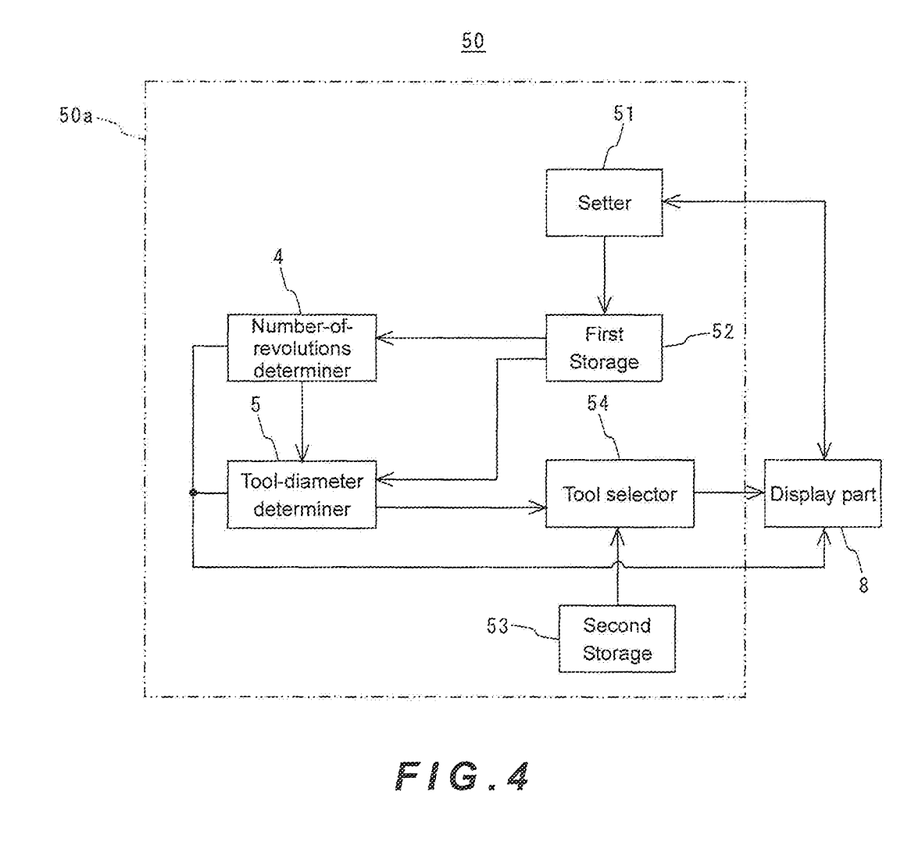
FIG. 4 is a block diagram showing a configuration of a cutting tool selecting apparatus according to an embodiment of the present invention.

As shown in FIG. 4, the cutting tool selecting apparatus 50 according to this embodiment includes a number-of-revolutions determiner 4, a tool-diameter determiner 5, a display part 8, a setter 51, a first storage 52, a second storage 53, and a tool selector 54. In this embodiment, a computing device 50*a* consisting of the number-of-revolutions determiner 4, the tool-diameter determiner 5, the setter 51, the first storage 52, the second storage 53, and the tool selector 54 may be incorporated in an NC device, or, alternatively, the computing device 50*a* may be applied as an external device which communicates with an NC device. Note that the number-of-revolutions determiner 4, the tool-diameter determiner 5, and the display part 8 are identical to those of the machining condition determining apparatus 1 shown in FIG. 1; therefore, description of them is omitted. The setter 51 and the tool selector 54 are functionally implemented by a CPU, which is provided in the cutting tool selecting apparatus 50, executing a predetermined program stored in a memory.

With the cutting tool selecting apparatus 50 according to this embodiment, by a user setting a desired cutting speed, a cutting tool can be selected which has a tool diameter which, when a machining is performed with the cutting tool and with the set cutting speed in the machine tool, achieves an improved cutting efficiency without shortening the tool life of the cutting tool. This is described in detail below.

The second storage 53 has previously stored therein tool diameters of a plurality of cutting tools. The plurality of cutting tools may be a plurality of cutting tools contained in a tool magazine provided in the machine tool or may be a plurality of cutting tools stored outside the machine tool (for example, in a storehouse or the like). In this embodiment, as shown in FIG. 5, a tool number, a tool diameter, a tool length, a tool type, and an evaluation, which is described later, of each of the plurality of tools stored in the second storage 53 are displayed in the display area 8*c* of the display part 8.

Figure 5:
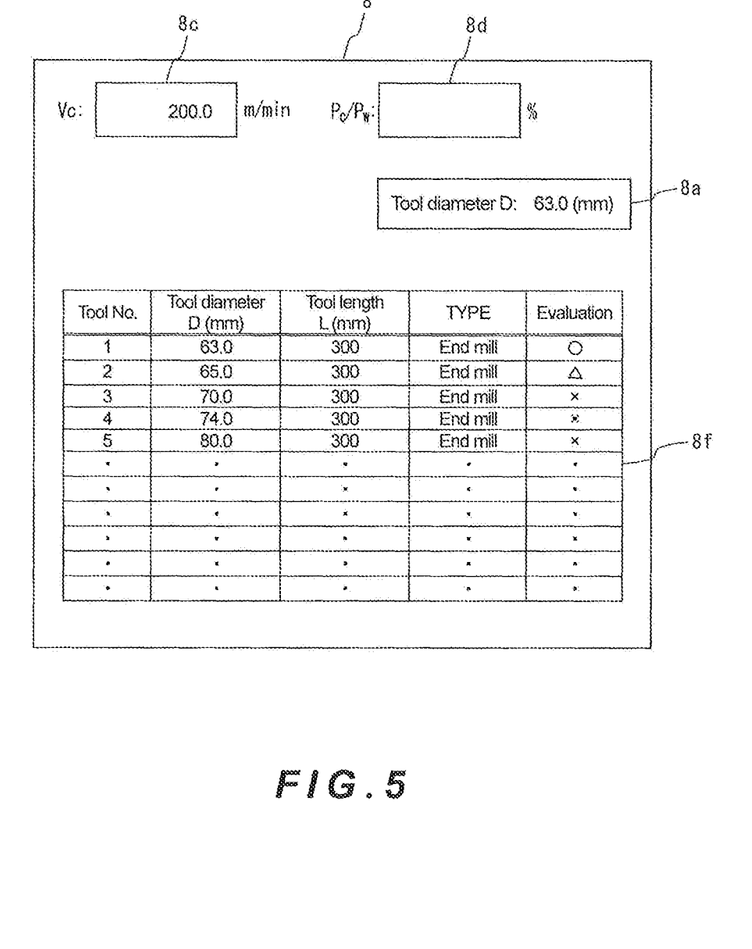
FIG. 5 is an illustration showing an example display configuration of the display part in FIG. 4.

As shown in FIG. 5, first, the user inputs a desired cutting speed into an input section 8*c* that is displayed in the display part 8 under control by the setter 51. The set information on the cutting speed is stored into the first storage 52 by the setter 51. Thereafter, similarly to the above-described machining condition determining apparatus 1, the number-of-revolutions determiner 4 determines a number of revolutions of the drive motor, and the tool-diameter determiner 5 calculates a tool diameter of the cutting tool to be used in the machine tool under the set cutting speed. As shown in FIG. 5, the tool diameter calculated by the tool-diameter determiner 5 is displayed in a display area 8a of the display part 8. Thereby, the user is allowed to visually recognize the calculated tool diameter.

Subsequently, the tool selector 54 compares the tool diameter calculated by the tool-diameter determiner 5 with the tool diameters stored in the second storage 53. For example, a case where the tool diameter calculated by the tool-diameter determiner 5 is 63.0 mm is described. In this case, there is, among the tool diameters stored in the second storage 53, a tool diameter which is coincident with the calculated tool diameter; therefore, the tool selector 54 selects the coincident tool diameter. Consequently, as shown in FIG. 5, the evaluation of the tool diameter selected by the tool selector 54 is displayed as "○" in a display area 8f of the display part 8.

Figure 6:
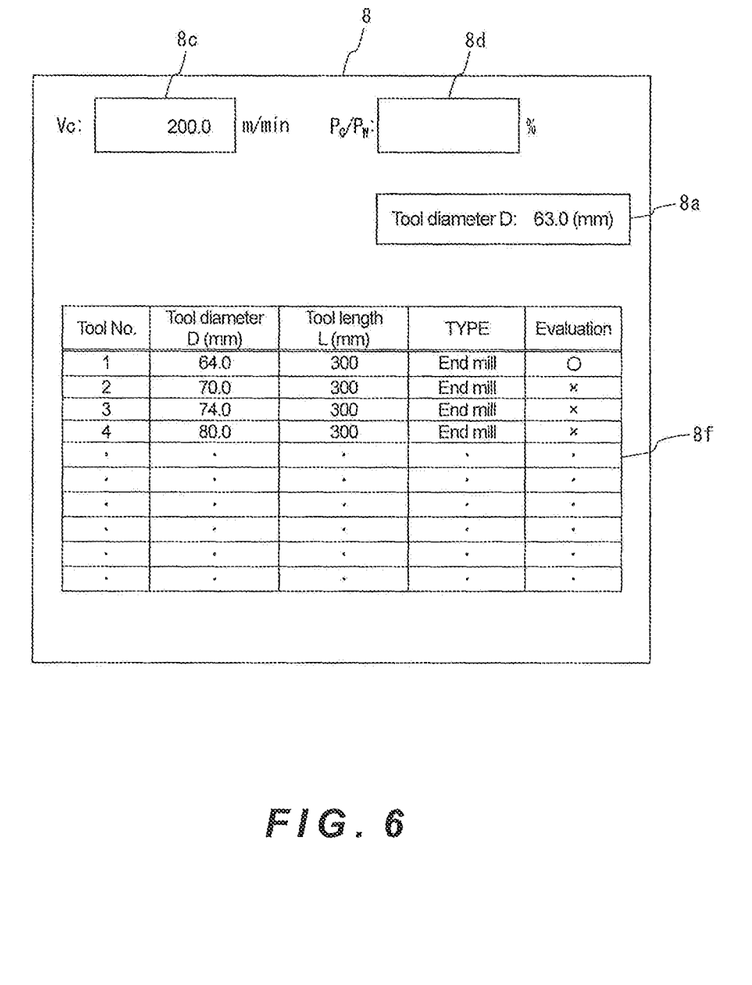
FIG. 6 is an illustration showing another example display configuration of the display part in FIG. 4.

In this process, in a case where the second storage 53 does not store data on a tool diameter which is coincident with the tool diameter (e.g., 63.0 mm) calculated by the tool-diameter determiner 5, the tool selector 54 selects a tool diameter closest to the calculated tool diameter. In this case, as shown in FIG. 6, the evaluation of the tool diameter of 64.0 mm that is the closest one to the calculated tool diameter of 63.0 mm is displayed as "○". Note that, as shown in FIG. 5, the evaluation of a tool diameter which is within the range of, for example, ±3 mm with respect to the tool diameter calculated by the tool-diameter determiner 5 may be displayed as "Δ". Further, the evaluation of a tool diameter which is out of the range of, for example, ±3 mm with respect to the tool diameter calculated by the tool-diameter determiner 5 may be displayed as "×". As described above, by setting a desired cutting speed, the user can recognize an optimum tool diameter to be used in the machine tool, i.e., a tool diameter achieving an improved cutting efficiency without shortening tool life.

As described above, in the cutting tool selecting apparatus 50 according to this embodiment, the tool-diameter determiner 5 can calculate a tool diameter corresponding to the number of revolutions of the drive motor, i.e., a tool diameter achieving an improved cutting efficiency, with a cutting speed set by the user being maintained (i.e., without increasing the cutting speed). Based on the calculated tool diameter, the tool selector 54 selects a cutting tool having a tool diameter coincident with the calculated tool diameter or a cutting tool having a tool diameter closest to the calculated tool diameter. Therefore, using the cutting tool selected by the tool selector 54 for machining in the machine tool enables an improved cutting efficiency without shortening the tool life of the cutting tool.

Hereinbefore, embodiments of the present invention have been described. However, the present invention is not limited to the foregoing contents, and the following variations can be applied to the present invention.

In the above embodiments, in terms of improving cutting efficiency by increasing a tool diameter as much as possible so as to perform a machining with fewer paths, the number-of-revolutions determiner 4 is configured to designate the minimum value of the number of revolutions corresponding to the steady-state value of the maximum output value of the drive motor as the number of revolutions of the drive motor. However, the present invention is not limited thereto. The number-of-revolutions determiner 4 may be configured to designate a maximum value corresponding to the steady-state value as the number of revolutions of the drive motor or may be configured to designate a number of revolutions between the minimum and maximum values corresponding to the steady-state value as the number of revolutions of the drive motor.

Further, in the above embodiments, the minimum value of the number of revolutions corresponding to the steady-state value of the maximum output value of the drive motor is designated as the number of revolutions of the drive motor to calculate a larger tool diameter. However, the present invention is not limited thereto. A configuration is possible in which, with a machining path being recognized in advance, whether a larger tool diameter should be used or a smaller tool diameter should be used is determined in terms of cutting efficiency, and the result of the determination is provided to the user.

Further, the above embodiments are intended to, in a case where a certain tool type (e.g., end mill) is initially employed in the machine tool, suggest a cutting tool of the same tool type which has a tool diameter achieving an improved cutting efficiency without shortening tool life. However, the present invention is not limited thereto. A configuration is possible in which a cutting tool of a different tool type (e.g., milling cutter) which has such a tool diameter is suggested.

Further, a configuration is possible in which a depth of cut to be obtained when the width of cut is changed and set with the cutting efficiency and the initial values other than the depth of cut and the width of cut being maintained is calculated as an output and displayed (see FIG. 3). Alternatively, a configuration is also possible in which a width of cut to be obtained when the depth of cut is changed and set with the cutting efficiency and the initial values other than the depth of cut and the width of cut being maintained is calculated as an output and displayed (see FIG. 3). That is to say, a configuration is possible such that variation of the depth of cut by change of the width of cut or variation of the width of cut by change of the depth of cut can be recognized.

REFERENCE SIGNS LIST

1 Machining condition determining apparatus
2 Setter
2a First setter
2b Second setter
2c Third setter
2d Fourth setter
2e Fifth setter
3 Storage
4 Number-of-revolutions determiner
5 Tool-diameter determiner
6 Motor-output-value calculator
7 Load-ratio calculator
8 Display part
9 Cutting-efficiency calculator
10 Condition changer
50 Cutting tool selecting apparatus
51 Setter
52 First storage
53 Second storage
54 Tool selector

The invention claimed is:

1. A machining condition determining apparatus determining machining conditions for a cutting tool to be used in a machine tool, comprising:
   a first setter setting a cutting speed of the cutting tool;
   a storage storing therein a maximum output value of a drive motor rotating a shaft holding the cutting tool and a number of revolutions of the drive motor corresponding to the maximum output value;
   a number-of-revolutions determiner obtaining a steady-state value of the maximum output value of the drive motor stored in the storage and determining a number of revolutions of the drive motor corresponding to the obtained steady-state value of the maximum output value; and a tool-diameter determiner calculating a tool diameter of the cutting tool based on the cutting speed set by the first setter and the number of revolutions of the drive motor determined by the number-of-revolutions determiner.

2. The machining condition determining apparatus according to claim 1, wherein the machining condition determining apparatus comprises:

a second setter setting, as initial values, a depth of cut $a_p$ by the cutting tool, a width of cut $a_e$ by the cutting tool, a maximum feed per tooth $f_z$ determined based on an edge geometry of the cutting tool, the number of revolutions n of the drive motor determined by the number-of-revolutions determiner, a number of tooth z of the cutting tool, a specific cutting resistance $k_c$ obtained in advance based on the tool diameter, and a mechanical efficiency η obtained in advance;

a motor-output-value calculator calculating an output value $P_c$ of the drive motor in accordance with an equation:

$$P_c = a_p \times a_e \times f_z \times n \times z \times k_c / (60 \times 10^6 \times \eta);$$

a load-ratio calculator calculating a load ratio, the load ratio being a ratio between the output value and the steady-state value of the maximum output value stored in the storage; and a display part displaying the load ratio.

3. The machining condition determining apparatus according to claim 2, wherein:

the machining condition determining apparatus further comprises a cutting-efficiency calculator calculating a cutting efficiency $C_e$ based on the output value, the specific cutting resistance, and the mechanical efficiency, the cutting efficiency $C_e$ being represented by an equation:

$$C_e = a_p \times a_e \times f_z \times n \times z; \text{ and}$$

the display part is configured to display the cutting efficiency.

4. The machining condition determining apparatus according to claim 3, wherein:

the machining condition determining apparatus comprises a third setter changing and setting the load ratio to a desired value;

the motor-output-value calculator is configured to recalculate the output value based on the changed and set load ratio;

the machining condition determining apparatus further comprises a condition changer changing at least one of major machining conditions based on the recalculated output value, the major machining conditions consisting of the depth of cut, the width of cut, and the maximum feed per tooth;

the cutting-efficiency calculator is configured to recalculate the cutting efficiency based on the recalculated output value and the value or values changed by the condition changer; and the display part is configured to display at least one of first information and second information, the first information consisting of the recalculated cutting efficiency, the second information consisting of the major machining condition or conditions changed by the condition changer and the major machining condition or conditions not changed by the condition changer.

5. The machining condition determining apparatus according to claim 3, wherein:

the machining condition determining apparatus further comprises a fourth setter changing and setting at least one of major machining conditions, the major machining conditions consisting of the depth of cut, the width of cut, and the maximum feed per tooth;

the cutting-efficiency calculator is configured to recalculate the cutting efficiency based on the value or values changed and set by the fourth setter;

the load-ratio calculator is configured to recalculate the load ratio based on the recalculated cutting efficiency; and the display part is configured to display at least one of the recalculated cutting efficiency and the recalculated load ratio.

6. The machining condition determining apparatus according to claim 3, wherein:

the machining condition determining apparatus further comprises a fifth setter changing and setting at least one of the depth of cut, the width of cut, and the maximum feed per tooth with the load ratio being maintained;

the cutting-efficiency calculator is configured to recalculate the cutting efficiency based on the value or values changed and set by the fifth setter; and the display part is configured to display the recalculated cutting efficiency.

7. A cutting tool selecting apparatus selecting a cutting tool to be used in a machine tool performing a machining with a plurality of cutting tools, comprising:

a setter setting a cutting speed of the cutting tool;

a first storage storing therein a maximum output value of a drive motor rotating a shaft holding the cutting tool and a number of revolutions of the drive motor corresponding to the maximum output value;

a number-of-revolutions determiner obtaining a steady-state value of the maximum output value of the drive motor stored in the first storage and determining a number of revolutions of the drive motor corresponding to the obtained steady-state value of the maximum output value;

a tool-diameter determiner calculating a tool diameter of the cutting tool based on the cutting speed set by the setter and the number of revolutions of the drive motor determined by the number-of-revolutions determiner;

a second storage having previously stored therein a tool diameter of each of the plurality of cutting tools; and a tool selector comparing the tool diameter calculated by the tool-diameter determiner with the tool diameters stored in the second storage, in a case where any of the tool diameters stored in the second storage is coincident with the tool diameter calculated by the tool-diameter determiner, the tool selector selecting the cutting tool having the coincident tool diameter, and in a case where none of the tool diameters stored in the second storage is coincident with the tool diameter calculated by the tool-diameter determiner, the tool selector selecting the cutting tool having a tool diameter closest to the tool diameter calculated by the tool-diameter determiner.

* * * * *